Feb. 24, 1959
J. J. SKELLY
2,874,438
CONDUIT CLAMP
Filed April 8, 1954
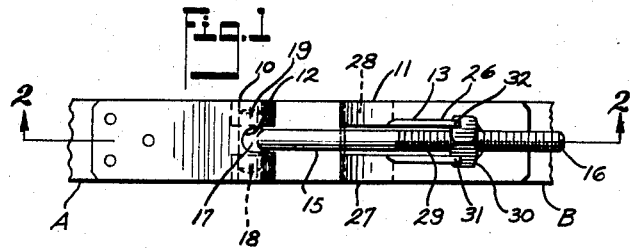
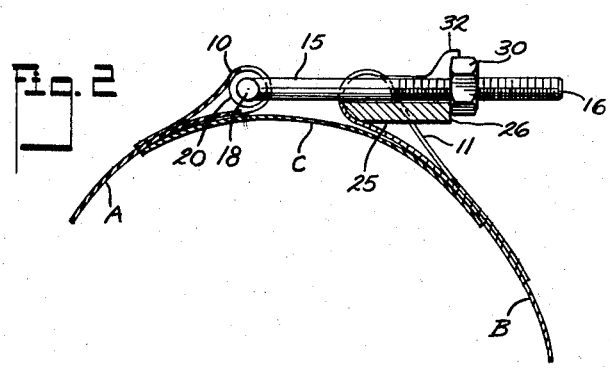
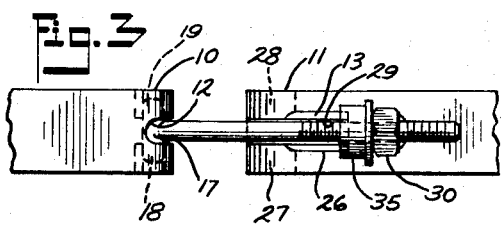
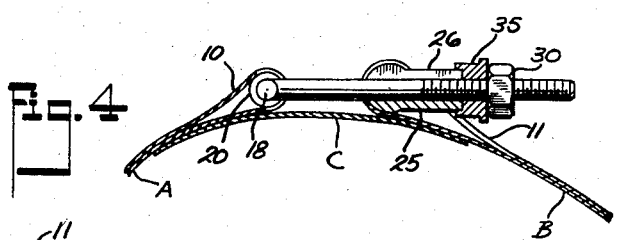
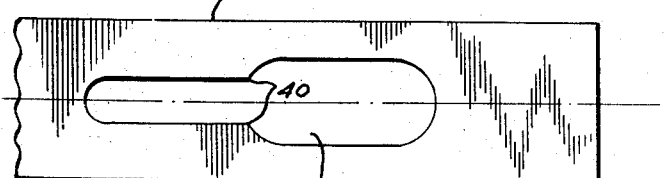
INVENTOR.
JAMES J. SKELLY
BY *Bates, Teare & McKean*
ATTORNEYS

United States Patent Office 2,874,438
Patented Feb. 24, 1959

2,874,438

CONDUIT CLAMP

James J. Skelly, Lakewood, Ohio, assignor to Specialty Products Corporation, Cleveland, Ohio, a corporation of Ohio Application April 8, 1954, Serial No. 421,781

2 Claims. (Cl. 24—279)

This invention relates to clamps generally and more particularly to an adjustable quick release type of clamp.

Various types of clamps are common fixtures for embracing and otherwise supporting certain objects such as conduits and the like. One type of clamp utilizes a flexible embracing band which contemplates the adjunct of a latch device for securing the clamp about the object. The clamp and latch arrangement varies depending upon the type of object embraced as well as the purpose they are intended to serve and the type of material with which they are associated. In most instances, it is desirable that the clamps be flexible and the latch of simple construction for quick manual manipulation. An inherent desirable characteristic common to most clamps relates to the provision of a positive clamping action which is adjustable and which may be readily applied and removed.

Accordingly, it is a principal object of this invention to provide an improved clamp having an adjustable latch which may be quickly released.

Another object of this invention relates to the provision of an improved flexible band clamp which can be readily adjusted without releasing it from the object.

Such objectives can be optimumly obtained by my improved clamp construction which in its preferred form embodies a flexible band in the form of an open loop for embracing an object and which includes a latch in the form of a draw-bolt having a trunnion pivoted at one free end of the band and a cooperating trunnion guide block pivoted at the other free end and having an axially slotted or grooved shank adapted to receive the draw bolt shank therein when the band embraces an object and the free ends are adjacent each other. A suitable interlock is provided between the guide block shank and the draw bolt shank by means of an abutment which can be adjustably positioned along the draw bolt shank for coaction with the guide block to restrain relative movement therebetween in all but one releasing direction.

In the drawings, Fig. 1 is a top view of a portion of the band clamp at its free ends illustrating the latch device;

Fig. 2 is a view taken along the lines 2—2 in Fig. 1 of the drawings;

Figs. 3 and 4 are respectively top and side sectional views of another embodiment of the band clamp of Figs. 1 and 2 illustrating a different form of latch interlock; and Fig. 5 is a partial view of one of the slotted end loops of the band clamp.

Referring now to Figs. 1 and 2 of the drawings, there is shown a portion of a flexible band clamp constituting the free ends thereof A and B, wherein one end A is provided with an extended tongue portion C adapted to underlie the other free end B to complete the band embracing loop. The flexible band clamp is preferably made of rustless spring steel or the like, and is adapted to encircle or embrace an object such as a conduit. In the form shown in the drawings, each free end of the band is turned back and secured upon itself to form end loops 10 and 11 and the tongue portion C is in the form of a separate band strip which may be spot welded or otherwise secured to the underside of the looped end A. The top portion of each of the end loops 10 and 11 is slotted longitudinally at 12 and 13 along the plane of the band so that when the band is looped about an object and the ends are positioned adjacent each other, the slots will be in alignment with each other.

The latch device for securing the two ends of the embracing band together includes a draw bolt 15 having a threaded shank 16 and a T-shaped head 17. The T-shaped head 17 forms trunnions 18 and 19 extending transversely of the shank which, as shown in Figs. 1 and 2 of the drawings, are seated within the loop 10 of the free end A of the band on either side of the slot 12, thus permitting the threaded shank 16 to extend outwardly through the slot and in a direction generally towards the other free end of the band. The trunnions 18 and 19 preferably carry a bearing sleeve 20 to provide an increased bearing surface for rotation within the loop 10.

The device also includes a draw-bolt guide in the form of a T-shaped trunnion block 25 having an axially slotted or grooved shank 26 with transversely extending trunnions 27 and 28 at one end. The trunnions are seated in the loop 11 at the other free end B of the band with the slotted shank 26 extending rearwardly through the longitudinal slot 13 and in the same general direction as the draw bolt 15 so that it overlies a portion of the corresponding free end of the band. The axial groove 29 in the guide shank 26 extends throughout the guide block and intersects the trunnions to form a U-shaped guide open at the top throughout its length for receiving the draw bolt shank therein. It is readily apparent that when the free ends A and B of the band are positioned adjacent each other the draw bolt shank 16 may be pivoted about its trunnion bearing into and out of position within the guide shank groove.

The latch device also includes an interlock in the form of an abutment adjustably carried by the draw bolt shank 16 for positioning against the extremity of the slotted guide shank 26 to restrain relative axial movement in the direction in which the free ends of the flexible band tend to separate. This arrangement is best shown in the sectional view of Fig. 2 of the drawings where the adjustable abutment is shown as an internally threaded nut 30 which may be positioned against the guide shank extremity. Although the adjustable abutment adequately interlocks the draw bolt 15 and guide shank 26 together against separating axial movement, it does not act to retain the draw bolt 15 within the U-shaped groove 29, and would not adequately prevent the draw bolt 15 from pivoting about its trunnion bearing in a vertical direction, when viewed in Fig. 2. Accordingly, as shown in the embodiment of Figs. 1 and 2 of the drawings, the guide shank 26 is provided with projections 31 and 32 at its extremity and on either side of the axial slot 29 which are adapted to overlie the beveled surfaces of the nut 30 when the nut is positioned against the guide shank extremity, thereby providing an effective interlock to restrain vertical pivotal movement of the draw bolt shank 16 out of the axial groove 29.

In Figs. 3 and 4 of the drawings, there is shown another embodiment wherein a cup-shaped washer 35 is carried by the draw bolt shank 16 intermediate the nut abutment 30 and the extremity of the guide shank. The cup-shaped washer is adapted to freely slide along the draw bolt shank 16 and has an enlarged axial recess at one end sufficiently large to receive and accommodate the guide shank extremity therein. Thus, when the nut abutment 30 is adjusted along the threaded shank 16 of the draw bolt it positions the cup-shaped washer 35 over the axial extremity of the guide shank and effectively retains the draw bolt assembly within the axial groove 29, thereby restraining all relative movement between the draw bolt 15 and the guide shank 26 except in a releasing direction. The latch may be quickly released by positioning the free ends of the band towards each other or by withdrawing the abutment, in which case the guide shank 26 is separated from the projections or cup-shaped washer and the draw bolt assembly may be rotated out of the groove 29 about its trunnion bearing.

In the preferred embodiments shown in the drawings, the longitudinal slot 13 in the loop 11 of the free end B of the band clamp is shaped in such a manner that it will engage and support the trunnion block 25 to limit its angular movement relative to the band to a predetermined position. This is accomplished as best shown in Fig. 5, by making the slot 13 relatively narrower than the guide shank 26 at the trunnion end of the guide block. The juncture 40 of the narrow and wider portions of the slot 13 provides shoulders against which the upper surface of the guide shank 26 will act and beyond which it cannot be pivoted. This juncture of the narrow and wide portions of the slot is preferably established to provide a predetermined latching angular relationship between the axis of the guide shank 26 and the axis of the draw bolt shank 16 so that when the guide shank 26 is raised to its permissive extremity, the axial groove 29 is in substantial axial alignment with the threaded shank 16 of the draw bolt.

Thus, there has been provided a band clamp having a latch which is readily adjustable while clamped about an object and which may be quickly released in any adjusted position to permit removal of the band clamp from the object, without removing the nut from the draw bolt.

I have shown and described what I consider to be the preferred embodiment of my invention, along with other modified forms and suggestions, and it will be obvious to those skilled in the art that other modifications and changes may be made without departing from the scope of my invention as defined by the appended claims.

I claim:

1. A clamp comprising a flexible band having free ends adapted to embrace an object, a draw-bolt having a threaded shank and a T-shaped head forming trunnions, means at one free end of the band for pivotally supporting the bolt trunnions with the bolt shank projecting therefrom, a loop fixed at the other end of the band having a longitudinal slot through a top portion thereof, a draw-bolt guide element having a T-shaped inner portion forming trunnions at one end and having a shank portion extending from said inner portion, said guide element having an axially projecting groove and having its trunnions pivoted in said loop with its grooved shank extending through said slot in said loop, said loop slot comprising a portion adjacent said guide element trunnions which is narrower in width than the remainder of said slot to provide a slot shoulder, said shouldered portion of said slot being narrower than the width of said guide element shank portion, said last mentioned shank portion being adapted to engage said slot shoulder for limiting the radially outward pivotal movement of said guide element with respect to said band to a position of generally axial alignment of said guide shank groove with said draw-bolt shank when the band embraces an object, said draw-bolt shank being adapted to overlie and be removably seated in said guide shank groove when the band embraces an object and the free ends of the band are positioned adjacent each other, and adjustable abutment means carried by said draw-bolt shank for releasable interlocking coaction with the free end of said guide element shank portion to prevent said removable relationship between said draw bolt shank and said guide shank groove.

2. A clamp in accordance with claim 1, wherein said adjustable abutment means comprises a cup-shaped washer and an internally threaded nut carried by said draw-bolt shank, said washer being adapted to be positioned by said nut to receive the free end of said guide element shank portion in the cup-shaped end of said washer to thereby retain said draw-bolt shank within said guide shank groove.

References Cited in the file of this patent

UNITED STATES PATENTS

| | | |
|---|---|---|
| 649,916 | Dietrich | May 22, 1900 |
| 991,769 | Catelain | May 9, 1911 |
| 2,270,375 | King | Jan. 20, 1942 |
| 2,368,929 | King | Feb. 6, 1945 |
| 2,680,892 | King | June 15, 1954 |
| 2,845,681 | Graef et al. | Aug. 5, 1958 |

FOREIGN PATENTS

| | | |
|---|---|---|
| 4,974 | Great Britain | of 1909 |
| 100,017 | Switzerland | July 2, 1923 |
| 706,899 | Great Britain | Apr. 7, 1954 |